July 14, 1959  R. J. TAKACS  2,894,781
JAW SUSPENSION FOR GRAPPLE
Filed Oct. 23, 1953  3 Sheets-Sheet 3
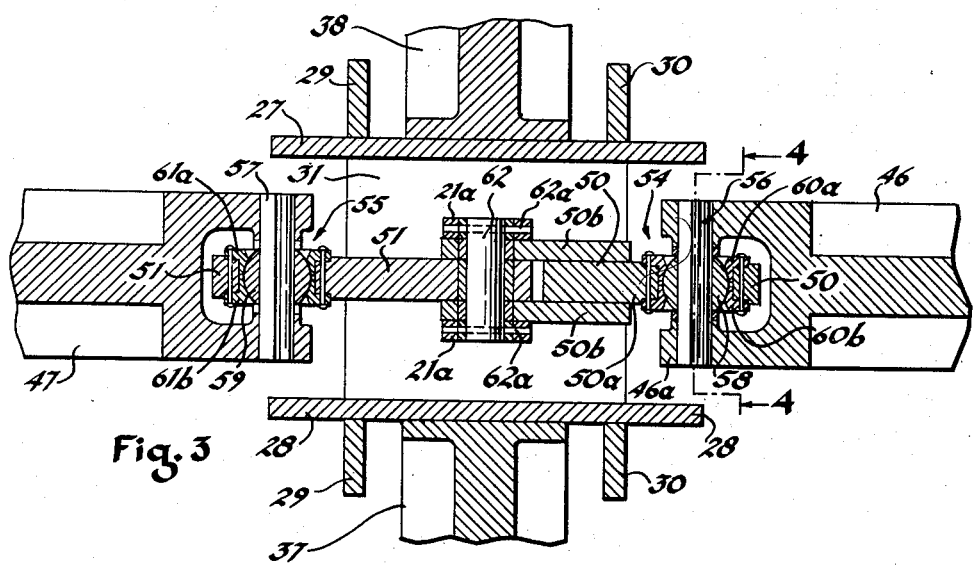
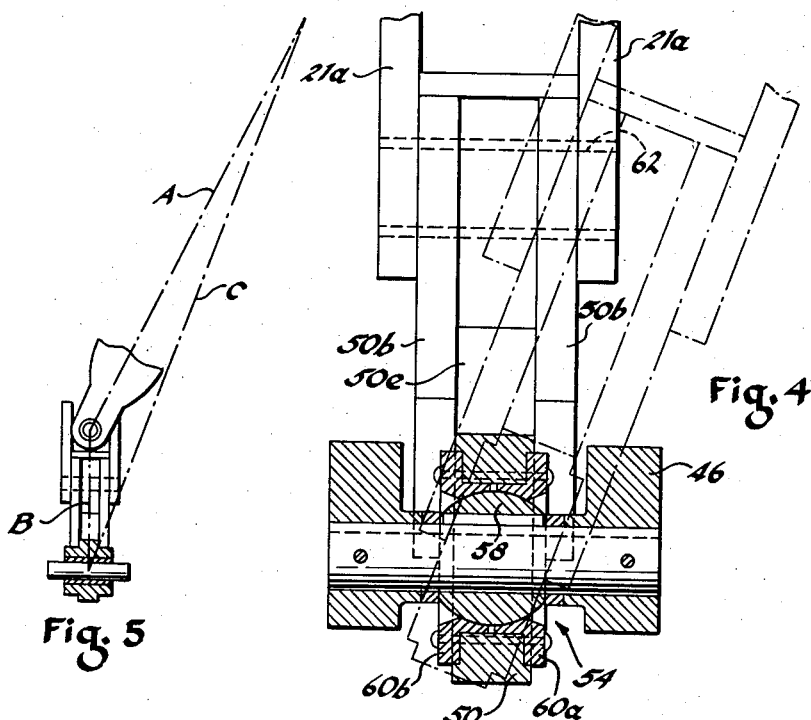
INVENTOR.
Robert J. Takacs
BY
Hyde, Meyer, Baldwin & Doran
ATTORNEYS

United States Patent Office 2,894,781
Patented July 14, 1959

2,894,781

JAW SUSPENSION FOR GRAPPLE

Robert J. Takacs, Cleveland, Ohio, assignor to The Owen Bucket Company, Cleveland, Ohio, a corporation of Ohio Application October 23, 1953, Serial No. 387,918

23 Claims. (Cl. 294—107)

This invention relates to improvements in a grappling device for handling earth, rocks and the like, and more particularly to the design thereof to reduce stress, strain and breaking force on the parts therein.

One of the objects of the present invention is to provide a grappling device having means permitting the parts thereof to always generally align with the closing force applied thereto to reduce twisting stresses therein.

Another object of the present invention is to provide a grappling device characterized by its ability to perform efficiently under varied conditions, its strong and sturdy nature, its operating efficiency, and its low maintenance cost because its component parts are not unduly subjected to damaging twisting stresses.

Other features of this invention reside in the arrangement and design of the parts for carrying out their appropriate functions.

Other objects and advantages will be apparent from the accompanying drawings and description and the essential features will be set forth in the appended claims.

In the drawings,

Fig. 3 is a sectional view taken along the line 3—3 of Fig. 1 through the lower head member, universal joints and toggle links when the grab members actuated thereby are in the fully open position;

Figure 1:
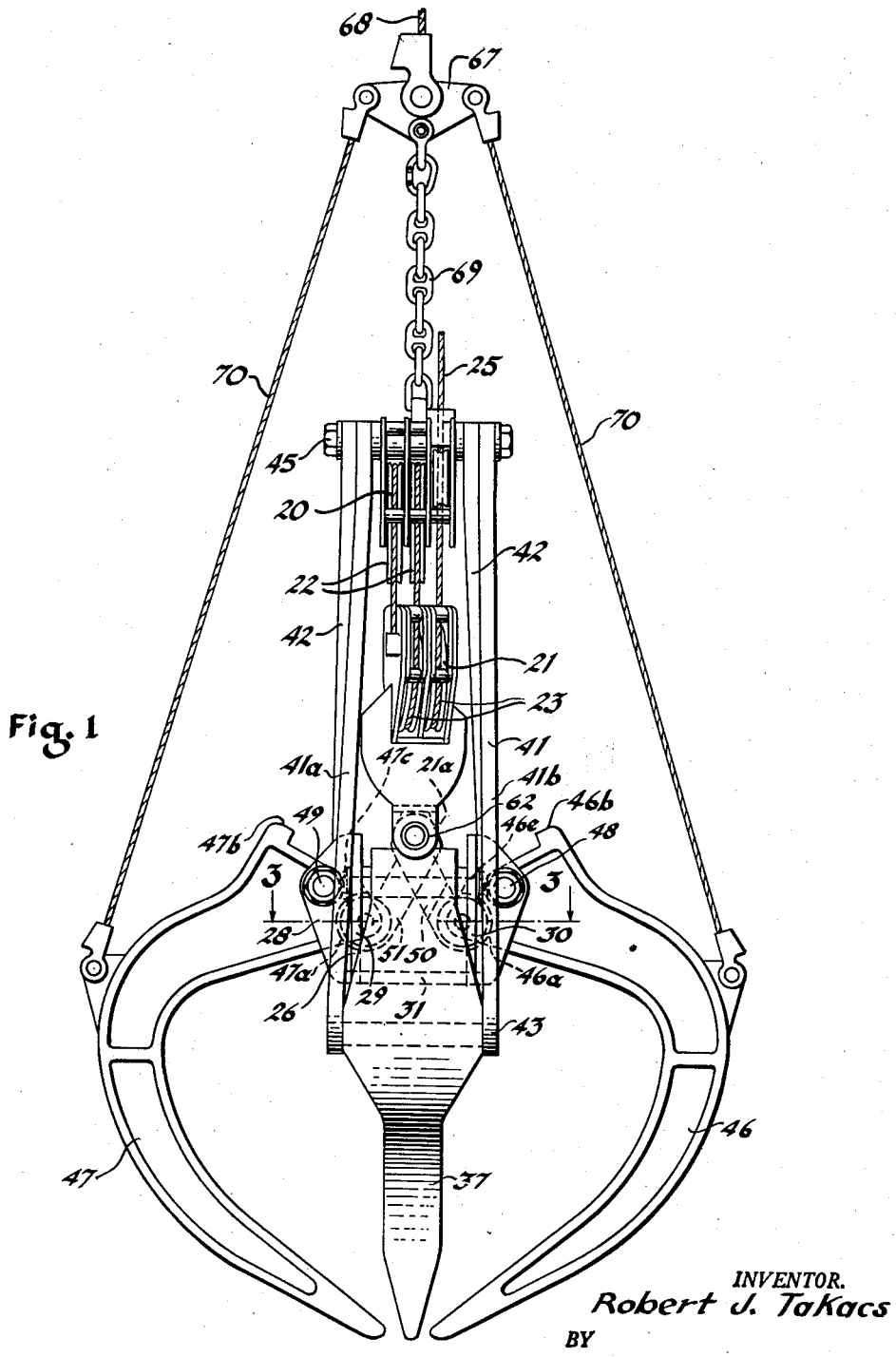
Fig. 1 is a front elevational view of the grappling device.

Fig. 4 is a sectional view taken along the line 4—4 of Fig. 3 showing the links in solid line and dot-dash line positions when the lower sheave block swings about the universal joint to bring the links into alignment with the closing force applied to the grappling device with the grab members partially closed; while Fig. 5 is a sectional view, similar to Fig. 4, but of a construction without a universal joint so that Fig. 5 clearly shows that the lines of force are not in direct alignment so that the toggle links are subjected to twisting and damaging force.

Before the grappling device here illustrated is specifically described, it is to be understood that the invention here involved is not limited to the structural details or arrangement of parts here shown since devices embodying the present invention may take various forms. Also, it is to be understood that the phraseology or terminology herein employed is for purposes of description and not of limitation, since the scope of the present invention is denoted by the appended claims.

While my invention might be adapted to various types of devices and especially various types of grappling devices, I have chosen to show the same as applied to a grappling device having a plurality of pairs of coacting grab members with means for opening and closing the same with the closing means being so constructed and arranged that the grabbing or holding effect between them when closing upon a piece of work is equalized even though the object held is of irregular shape.

My improved grappling device is intended primarily for the handling of rocks, and especially very large rocks, such as is necessary in the building of breakwaters, the clearing of harbor bottoms and similar locations, although it will be understood that my grappling device may be used in any place where grapples are normally necessary.

It is a well known fact that when objects of irregular shape are grasped by a conventional grappling device having the hooks, jaws or grab members closing simultaneously, those members which first engage the object receive substantially the entire strain with consequent unsatisfactory results. This generally causes the entire gripping pressure to be exerted between two members so that it is impossible to firmly grip an irregular object. The object has a tendency to twist and thus exert side strain on the grab members. This results in part breakage and pushing the object out of the grasp of the grappling device.

My improved device equalizes the load on all the grab members without unnecessary complication of parts. The grab members close independently of one another and each grips the object firmly regardless of its shape. Also, the closing force on my grappling device aligns the parts of this device so as to minimize any twisting forces thereon that might tend to break the parts.

My grapple device is also adapted for digging earth or other material.

The terms "jaws," "jaw members," or "grab members," as used throughout the specification and claims, are intended to include not only hook members or tines as shown in most of the views but also other types of jaws and digging members such as the so-called "orange-peel" type of bucket or other members of intermediate form where the same are actuated by the improved mechanism described hereinafter.

Figure 2:
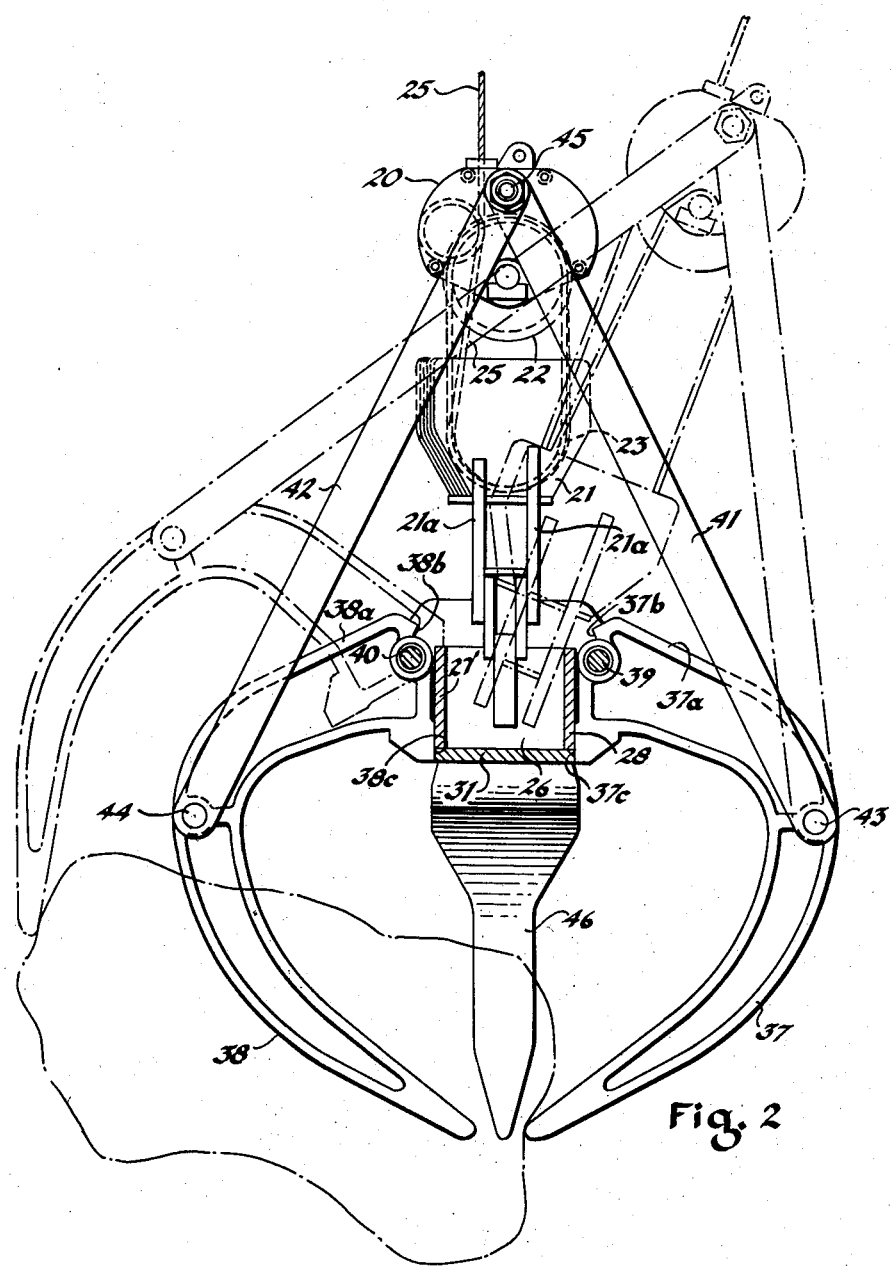
Fig. 2 is a side elevational view of the grappling device partially in section but with some grab member operating parts omitted for clarity and with the grab members closed on an object in dash-dot line position.

My device is generally shown in Figs. 1 and 2 and includes an upper sheave block and head member 20 and a lower sheave block member 21 in which are mounted sheaves 22 and 23 respectively. It being understood that the arrangement of the sheaves may be in any suitable manner and is not a part of the present invention. As usual, a closing line 25 is reeved around the sheaves of the upper and lower sheaves 22 and 23 and runs to suitable operating machinery for causing relative approach and separation movement between sheave block members 20 and 21. A lower head member or frame 26 supports the grab members of which I show two coacting pairs positioned substantially at right angles to each other. Each of these grab members is independently mounted by a suitable pivot or hinge pin on the lower head member 26.

The construction of the lower head member 26 is best shown in Figs. 1, 2 and 3. Parallel, opposite walls 27 and 28 pivotally support one pair of grab members and other parallel opposite walls 29 and 30 pivotally support the other pair of grab members. These intersecting parallel members form a central box like portion having a bottom 31. The lower head member 26, as shown, is constructed of plate members welded together but it will be understood that the same may be fashioned by casting or otherwise, as desired.

One pair of grab members 37, 38 are pivotally mounted on and between walls 29 and 30 of the lower head member by pivot pins 39 and 40 respectively so as to always move in one plane. Each of these grab members has at its upper end an arm portion 37a and 38a at an outer portion of which are connected links 41 and 42 respectively. Link 41 is pivotally connected to grab member 37 at the point 43 and link 42 likewise connected to grab member 38 at the point 44. The link connections extend upwardly to the head block where they are suitably pivoted as upon the single pivot pin 45. Each of these links, for example link 41 in Fig. 1, comprises generally parallel side members 41a and 41b and a diagonal bracing member (omitted from Fig. 1).

Each grab member has suitable shoulder portions in Fig. 2 for stopping the movement of the grab member at its full opened and full closed positions. These portions of grab member 37 are designated 37b and 37c and similar portions on grab member 38 are similarly designated. While the grab members 37 and 38 are shown as substantially bell crank or L-shape in form it will be understood that they need not be necessarily so constructed so long as there is a sufficient arm leverage between the pivots 43 and 39 on the one grab member and the pivots 44 and 40 on the other grab member. The operation of these two grab members just described and best seen in Fig. 2 will be readily recognized as similar to the action of the usual clamshell type.

In Figs. 1 and 3, the other pair of grab members 46 and 47 are pivotally mounted between and on the side walls 27 and 28 of lower head member 26 by pivot pins 48 and 49 respectively to always swing in another plane. The two planes of movement of the grab member pairs intersect and are kept in right angular relationship with respect to each other by lower head member 26. These jaws are also provided with suitable stop portions 46b, 46c and similarly designated parts on grab member 47 for limiting their full open or full closed position by bearing against surfaces on lower head member 26. Crank arm portions are provided for oscillating these grab members about their pivots and in the present disclosure these crank arm portions are the parts 46a and 47a formed integral with the respective grab member portions.

Between the lower sheave block member 21 and these crank arm portions are suitable link connections for moving the grab members 46 and 47 and connecting lower head member 26 and lower sheave block member 21 for relative movement toward and away from each other. In the form shown these links are a pair of toggle links 50 and 51 pivotally connected together by pin 62 to the lower sheave block member 21. The other or lower ends of the toggle links are connected by universal joints 54 and 55 with the crank arm portions 46a and 47a respectively. These universal joints 54 and 55 comprise respectively shafts 56 and 57 extending through aligned holes and pinned to crank arm portions 46a and 47a respectively with ball members 58 and 59 keyed to said shafts and straddled by annular spacers. Split, ball seat or socket portions 60a, 60b, and 61a, 61b, annular in form, are pinned to the lower ends of the toggle links and have their spherical complementary surface engaging against the spherical periphery of ball members 58 and 59. These universal joints are within the lower head member 26 and are located generally within the zone bounded by the grab member pivot pins 39, 40, 48 and 49.

Fig. 3 more clearly discloses the toggle link connections. Here, the link 50 is shown as having a center part 50a having welded thereto straddling parts 50b. Link 51 is pivotally connected between parts 50b by a pivot shaft 62 secured by retaining pins 62a to depending ears 21a on lower sheave block 21 so that both toggle links 50 and 51 may oscillate freely on shaft 62 on their bushing lined holes. It should be noted that the toggle links are located between the confining opposite side walls 27 and 28 of the lower head member 26. Also, in Fig. 3, the grab members 46 and 47 are in the fully open position with the toggle links 50 and 51 substantially straight and with the shafts 56, 57 and 62 in substantially a straight horizontal line in contrast with their Fig. 1 position. In this fully open position, the depending ears 21a are located immediately above the top surface of bottom wall 31 of the lower head member 26.

The description of the grab member 46 and 47 and a study of Fig. 3 reveal that this pair of grab members is actuated upon relative movement between the lower sheave block member 21 and the lower head member 26; and this relative movement, because of the toggle links 50 and 51, will cause oscillation of grab members 46 and 47 about their pivots 48 and 49.

In Fig. 1, located above the head block is a holding member 67 to which a suitable holding line may be attached as at 68. The head block 20 is suitably suspended below the member 67 in a manner to permit relative movement between them. The connection shown comprises chains 69. Between the holding member 67 and the grab members 46 and 47 extend cables 70 which serve to move the connected jaws to open position upon suitable movement of the parts as will be next described.

In the operation of the device with all of the grab members in open position, both the holding line 68 and the closing line 25 are payed out until the grapple comes to rest over the object to be seized. An upward pull is then applied to closing line 25 which causes resultant relative approach between the sheave block members 20 and 21. The result is an upward pull on lower head 26, which tends to close the grab members simultaneously. The action is transmitted through pivot shaft 62 and toggle links 50 and 51, with resultant oscillating of the pair of grab members 46 and 47 from their wide open position toward their closed position, shown in full lines, Fig. 1. The lifting action of lower head 26 oscillates the remaining pair of grab members 37 and 38 about their respective pivots 39 and 40. These grab members are shown in their closed position in dot-dash lines in Fig. 2. This movement will cease when each individual grab has engaged the object independently, whether the object be regular or irregular in shape, or all grabs have come to a completely closed position, shown in the drawing.

If one of the grab members 46 and 47 strikes a side of an object, the other grab member is still free to move because of the arrangement of links 50 and 51. The other pair of grab members 37 and 38, independently connected to the upper and lower head members, are also free to engage the object separately and independently. When all four grab members have firmly engaged the object between them, further relative approach movement between the sheave block members 20 and 21 ceases and the object may be raised and transported wherever desired. If an object is irregular in shape, the two grab members of each pair may grab on engaging surfaces on opposite sides of the object with the distances between the surfaces on opposite sides engaged by each pair being different.

During release of the object, the closing line 25 is payed out. The sheave block members 20 and 21 move apart to release grab members 37 and 38. Also, the toggle links straighten as lower head member 26 and lower sheave block member 21 approach so as to open grab members 46 and 47 which occurs when that portion of the device from the upper head block member 20 down moves sufficiently away from the holding member 67 to create a tension in cables 70 which aids in the opening movement of the grab members 46 and 47.

The universal joints 54, 55 in Figs. 3 and 4 connecting grab members 46, 47 respectively to links 50, 51 provide a distinct advantage. They permit the lower sheave block 21 to swing into alignment with the line of action of the grappling device closing force by moving to any position between the dot-dash line position in Fig. 4 or a corresponding position the other side of center. This is especially necessary when the grab members 37 and 38 close independently on an irregular object normally tending to swing the upper sheave block member 20 out of the solid line link position of Fig. 2, as shown by the dot-dash line position. The universal joints permit the toggle linkage and lower sheave block member 21 to follow this movement by swinging from the solid line to the dot-dash line positions in Figs. 2 and 4. The dot-dash line positions correspond. Hence, the grappling device closing force exerted on closing line 25, on lower sheave block 21, on grab members 46, 47 by links 50, 51 and on links 50, 51 are generally in alignment to reduce stress on the grappling device parts and especially on the toggle links.

Explaining it in another manner, one might say in referring to Fig. 2, that grab members 37 and 38, connecting links 41 and 42, upper sheave block and head member 20, and lower head member 26 are movable generally in one plane with some or all of these parts serving as a first actuating means to aid in operating grab members 37 and 38. A second actuating means (comprising reeved closing line 25, lower sheave block 21, toggle links 50 and 51, and universal joints 54 and 55) is connected to this first actuating means and to grab members 46 and 47 for independently operating each grab member in turn. This second actuating means can swing freely into and out of the plane of pivotal action of grab members 46 and 47 until the closing forces align. For example, in Fig. 2, the plane of action of grab members 46 and 47 is vertical while the second actuating means is in this plane in the solid line position but may swing out of the plane into the dot-dash line position.

The particular location of the universal joints is important. For example, if the single pivot 62 in Fig. 1 is replaced by two spaced pivots adjacent the lower sheave block member, as shown in Fig. 5, to form a universal joint there in place of universal joints 54 and 55, the lines of force will not coincide but the closing force exerted by closing line 25 will act on lower sheave block member 21 along line A in Fig. 5 while the grab member closing force will be through the toggle links along line B. With my universal joints, the line of force and loci of the parts is along line C. Hence, with the Fig. 5 construction, the toggle links along line B are subjected to a lateral, bending or twisting force by the side thrust along line A. This force, when of sufficient magnitude, tends to twist and break the toggle links, shear the retaining pins, move the pivotal shafts endwise, and jam the Fig. 3 toggle parts against and between the lower head member side walls 27 and 28 so as to make the grappling device inoperative. The present invention with universal joints 54 and 55 between toggle links 50 and 51 and grab members 46 and 47 overcomes this difficulty.

Various changes and details and arrangement of parts can be made by one skilled in the art without departing from either the spirit of this invention or the scope of the appended claims.

What I claim is:

1. In a grappling device, a head, two pairs of coacting grab members pivotally connected for relative movement to said head with one pair movable in one plane and the other pair movable in another plane angularly disposed thereto, a first actuating means movable in said first plane and connected to said one pair of grab members to aid in operating them, and a second actuating means connecting said first actuating means and said other pair of grab members for independently operating each grab member in turn, said second actuating means including means constructed for free swinging movement of at least a portion of this last mentioned means through an arc into the line of action of the closing force applied to said grappling device so that this force acts generally through the connection between the second actuating means and said other pair, said arc lying in a plane angularly disposed with respect to said other plane.

2. In a grappling device, a head, two pairs of coacting grab members pivotally connected for relative movement to said head with one pair movable in one plane and the other pair movable in another plane intersecting but angularly disposed thereto, a first actuating means movable in said first plane and connected to said one pair of grab members to aid in operating them, and a second actuating means connecting said first actuating means and said other pair of grab members for independently operating each grab member pair in turn, said second actuating means having universal joint means permitting it to swing freely into and out of said second plane until the line of action of the grab members closing force exerted on said second actuating means acts through the connection between the second actuating means and said other pair when the grab member pairs close independently on an object tending to normally swing said second actuating means out of said alignment.

3. In a grappling device, two pairs of coacting grab members, an upper head, two lower members mutually aligned with said upper head, means connecting said lower members for relative movement toward and away from each other, a closing line reeved between said upper head and one of said lower members for causing relative approach and separating movement between them, operating means actuated by relative movement between said lower members for operating one of said pairs of grab members, operating means actuated by relative movement between said upper head and one of said lower members for operating the other of said pairs of grab members, and actuating means to swing said first recited one lower member generally into the line of action of the grappling device closing force acting on one of said pairs of grab members.

4. In a grappling device, two pairs of coacting grab members, a pair of sheave blocks, a head member connected with one of said blocks for relative movement toward and away from it, means for causing relative approach and separating movement between said sheave blocks and for also causing relative movement between said head member and its associated block, means actuated by relative movement between said blocks for operating one pair of grab members, means actuated by relative movement between said head member and its associated block for operating the other pair of grab members, and other actuating means to swing said sheave block associated with said head member generally into the line of action of the grappling device closing force acting on the other sheave block and on one of said pairs of grab members.

5. In a grappling device, two pairs of coacting grab members, an upper head including a sheave block, a lower head, a sheave block mounted on said lower head for vertical movement relative thereto, a closing line reeved about said upper and lower sheave blocks for causing relative approach and separating movement between them, a first grab member operating means actuated by relative movement between said lower head and said lower sheave block for operating one pair only of grab members, a second grab member operating means actuated by relative movement between the upper and lower heads for operating the other pair of grab members, and lower sheave block swinging means to swing said lower sheave block generally into the line of action of the grappling device closing force exerted by said closing line on said one pair of grab members.

6. In a grappling device, an upper head including a sheave block, a lower head, a sheave block mounted on said lower head for movement relative thereto, a closing line reeved about said upper and lower sheave blocks for causing relative approach and separating movement between them, two pairs of coacting grab members, each member of each pair being pivotally supported on said lower head independently of the other members, means actuated by relative movement between said lower head and said lower sheave block for operating one pair only of grab members, said actuating means including connecting means between said lower sheave block and said one pair of grab members and including a universal joint between said connecting means and said one pair of grab members so that the grappling device component parts may align with the direction of the grappling device closing force to reduce stress thereon, and other actuating means actuated by relative movement between said upper and lower heads for operating the other pair of grab members.

7. In a grappling device, an upper head, a sheave block carried thereby, a lower head, a lower sheave block, motion transmitting means operatively connecting said lower sheave block with said lower head including universal joint means closer to said lower head than to said lower sheave block, sheave block moving means for causing relative movement between said sheave blocks, two pairs of coacting grab members pivotally mounted on said lower head, first grab member operating means actuated by said motion transmitting means for operating one pair of grab members, and second grab member operating means actuated by relative movement between said upper and lower heads for operating the other pair of grab members.

8. In a grappling device, an upper head, a sheave block carried thereby, a lower head, a lower sheave block above said lower head, sheave block moving means for causing relative approach of said sheave blocks, two pairs of coacting grab members pivotally mounted on said lower head, connection means operatively associating said lower head and lower sheave block for relative movement, said connection means including a universal joint means within said lower head and located generally within the zone bounded by the pivotal mountings of said grab members, a first grab member operating means actuated by relative movement between said lower head and lower sheave block for operating one pair of grab members, and a second grab member operating means actuated by relative approach between said upper and lower heads for operating the other pair of grab members.

9. In a grappling device, upper and lower sheave blocks, a closing line reeved about said blocks for causing relative approach and separating movement between them, a lower head member, two coacting pairs of jaw members, said pairs being positioned at right angles to each other, each jaw member of one pair having at its upper end an arm portion extending at an angle from the jaw portion inwardly to said lower head member and there pivotally connected, a link connecting an outer part of each arm portion with said upper sheave block, each jaw member of the second pair being pivotally mounted on said lower head member, link connections between said lower sheave block and each of said jaw members of the second pair for oscillating the latter about their pivots as the lower sheave block moves relative to said lower head member, and a universal joint connection between said last mentioned link connections and each of said jaw members of the second pair so that the lower sheave block can orient itself whereby twisting force on said link connections is eliminated.

10. In a device of the class described, an upper sheave block, a jaw support, a pair of coacting jaws pivotally mounted on said support, means holding said upper sheave block and said jaw support in spaced relation, a lower sheave block mounted for vertical movement relative to said jaw support, a pair of toggle links one for operating each jaw, said toggle links being pivotally connected together, connecting means operatively connecting the other end of each toggle link with its respective jaw, said lower sheave block being operatively connected with said toggle links where the latter are connected together, and means for causing relative movement between said sheave blocks in a manner to actuate said toggle links in jaw-closing direction, said connecting means including a universal joint means operatively connecting said other end of each toggle link with its respective jaw for oscillation of each toggle link about the universal joint means so that the toggle links will align with the device closing force applied thereto by the lower sheave block to eliminate twisting force thereon.

11. In a grappling device, an upper head, a lower head, two pairs of independently operable coacting jaw members, at least one pair of said jaw members being mounted on said lower head, means for closing said one pair of jaw members by relative approach movement between said heads, operating mechanism for said other pair of jaw members operable in jaw closing direction by relative approach between said upper head and said mechanism, said operating mechanism including a part carried by said lower head and including universal joint means between said operating mechanism and said other pair of jaw members, and approach movement means for causing relative approach between said upper head and said operating mechanism.

12. In a grappling device, upper and lower sheave blocks, a closing line reeved about said blocks for causing relative approach and separating movement between them, a head member, two coacting pairs of jaw members, said pairs being positioned at right angles to each other, each jaw member of one pair only being pivotally mounted on said head member and having a linkage connection with said upper sheave block arranged to close said one pair of jaw members by relative approach of said upper sheave block and said head member, each jaw member of the second pair being pivotally mounted on said head member, and link connections between said lower sheave block and each of said jaw members of the second pair only for oscillating the latter about their pivots as the lower sheave block moves relative to said lower head member, and a universal joint connection between said last mentioned link connections and each of said jaw members of the second pair so that the lower sheave block can orient itself whereby twisting force on said link connections is eliminated.

13. In a grappling device, upper and lower sheave blocks, a closing line reeved about said blocks for causing relative approach and separating movement between them, a lower head member, two coacting pairs of jaw members, said pairs being positioned at right angles to each other, each jaw member of one pair being pivotally mounted on said lower head member and having a linkage connection with said upper sheave block arranged to close said one pair of jaw members by relative approach of said upper sheave block and said lower head member, each jaw member of the second pair being pivotally mounted on said lower head member, a crank arm portion for oscillating each jaw member of said second pair about its pivot, and a pair of toggle links pivotally connected to each other and there connected to said lower sheave block, the free end of each toggle link being connected to one of said crank arm portions by a universal joint connection.

14. In a device of the class described, an upper sheave block, a jaw support, two pairs of coacting jaws pivotally mounted on said support, a pair of toggle links one for operating each jaw of one of said pairs of jaws, said toggle links being pivotally connected together at one end and the other end of each toggle link being operatively connected by a universal joint with its respective jaw to oscillate the same about its pivot, lower sheave block means, said lower sheave block means being operatively connected with said toggle links at said one end where the latter are pivotally connected together, jaw actuating means for causing relative approach between said upper sheave block and said lower sheave block means to actuate both pairs of jaws to grip material between them.

15. In a grappling device, four grab members arranged in two pairs with each pair including two grab members for grabbing opposite sides of an object, a first means for closing one pair of grab members on an object, and a second means for closing the other pair of grab members independently of the closing of said first pair by said first means for grasping simultaneously by all members an object of irregular shape, at least one of said means including universal joints directly attached to grab members of one of said pairs.

16. In a grappling device, four grab members arranged in two pairs with each pair including two grab members for grabbing opposite sides of an object, a common support, means operatively connecting all of said grab members to said support for relative movement between said grab members, and means responsive to a closing force for closing each grab member into a position for grasping simultaneously by all members an object of irregular shape, said means including universal joints directly attached to grab members of one of said pairs so as to swing the grappling device parts generally into alignment with the closing force applied to said grappling device to reduce stress on said parts.

17. In a grappling device, four grab members arranged in two pairs with each pair including two grab members for grabbing opposite sides of an object, and closing means for closing by closing force said grab member pair independently into object gripping engagement, said closing means including spaced sheaves with a closing line reeved therearound for moving said sheaves together during closing said grab members by applying said closing force to said line and including universal joint means attached to grab members of one said pairs for swinging by said closing force the sheaves and the portion of said closing means between said sheaves and said universal joints generally into alignment with the grab members closing force to reduce stress thereon.

18. In a grappling device, at least three grab members, means movably mounting said grab members so that the movement of each grab member is restricted to movement in its own movement plane, and grab member closing means for closing said grab members with each grab member moving only in its own movement plane so that all members grasp simultaneously an object of irregular shape, said grab member closing means including a universal joint directly attached to at least some of said grab members.

19. In a grappling device, at least three grab members, and grab member closing means independently closing at least some of said grab members so that all members grasp simultaneously an object of irregular shape, said grab member closing means including a universal joint means directly attached to at least some of said grab members so that closing of said grab members swings the grappling device parts generally into alignment with the closing force applied to said grappling device to reduce stress on said parts.

20. In a grappling device, a plurality of grab members, and grab member closing means for closing all of said grab members into gripping engagement with any shape object, said grab member closing means including spaced sheaves with a closing line reeved therearound for moving said sheaves together during closing said grab members and including swinging means for swinging the sheaves and changing the direction of the closing force on said jaws so that said sheaves and closing force generally aligned with the closing force applied to said grappling device to reduce stress on said parts.

21. In a grappling device, a plurality of grab members, and grab member closing means for closing at least some of said grab members independently, said grab member closing means including spaced sheaves with a closing line reeved therearound for moving said sheaves together during closing said grab members and including universal joint means attached to at least some of said grab members so that closing of said some grab members swings the sheaves and univeral joint generally into alignment with the grab members closing force to reduce stress thereon.

22. In a device of the class described, a pair of coacting jaws pivotally mounted in a frame, a pair of toggle links one for operating each jaw, said toggle links being pivotally connected together at their knuckle, the other end of each toggle link being operatively connected with its respective jaw by a universal joint to oscillate the same about its pivot, and toggle knuckle moving means for moving said toggle knuckle relative to said frame in a direction to actuate said jaws in the closing direction so that the toggle links are aligned by the universal joints with the device closing force to eliminate the twisting force thereon.

23. In a grappling device, four grab members arranged in two pairs with each pair including two grab members for grabbing on engaging surfaces of the opposite sides of an object wherein the distances between the surfaces on opposite sides engaged by each pair are different, and grab member closing means for closing by closing force said grab member until each independently engages its workpiece surface, said grab member closing means including spaced sheaves with a closing line reeved therearound for moving said sheaves together during closing said grab members by applying said closing force to said line and including swinging means responsive to said closing force for swinging the sheaves and changing the direction of the closing force on said jaws so that said sheaves and last mentioned closing force generally align with the closing force applied to said grappling device to reduce stress on said parts.

References Cited in the file of this patent

UNITED STATES PATENTS

| | | |
|---|---|---|
| 254,824 | Johnson | Mar. 14, 1882 |
| 255,172 | Johnson | Mar. 21, 1882 |
| 1,935,898 | Zimmerman et al. | Nov. 21, 1933 |
| 2,052,211 | Botten | Aug. 25, 1936 |
| 2,103,370 | Johnson | Dec. 28, 1937 |
| 2,652,280 | Billings | Sept. 15, 1953 |

FOREIGN PATENTS

| | | |
|---|---|---|
| 199,165 | Austria | Sept. 25, 1930 |